US011908314B2

(12) United States Patent
Farrash et al.

(10) Patent No.: US 11,908,314 B2
(45) Date of Patent: Feb. 20, 2024

(54) DIGITAL EMERGENCY ALARMS WITH INTELLIGENT EVACUATION PLAN

(71) Applicant: SAUDI ARABIAN OIL COMPANY, Dhahran (SA)

(72) Inventors: Raeid Khalid Farrash, Udhailiyah (SA); Qassem Ahmed Al-Alwi, Udhailiyah (SA); Hassan Ahmed Algizani, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 81 days.

(21) Appl. No.: 17/652,869

(22) Filed: Feb. 28, 2022

(65) Prior Publication Data

US 2023/0274625 A1 Aug. 31, 2023

(51) Int. Cl.
*G08B 7/06* (2006.01)
*G08B 21/02* (2006.01)

(52) U.S. Cl.
CPC ............. *G08B 7/066* (2013.01); *G08B 21/02* (2013.01)

(58) Field of Classification Search
CPC ...................................................... G08B 7/066
See application file for complete search history.

(56) References Cited

U.S. PATENT DOCUMENTS

| | | | | |
|---|---|---|---|---|
| 10,045,187 | B1 * | 8/2018 | Soleimani | H04W 4/90 |
| 11,043,095 | B1 * | 6/2021 | Derickson | G08B 27/001 |
| 2014/0320282 | A1 | 10/2014 | Zhang | |
| 2019/0066464 | A1 | 2/2019 | Wedig et al. | |
| 2019/0295207 | A1 | 9/2019 | Day et al. | |

FOREIGN PATENT DOCUMENTS

| | | | |
|---|---|---|---|
| GB | 2527778 | A | 1/2016 |
| KR | 102261602 | B1 | 6/2021 |

* cited by examiner

*Primary Examiner* — Travis R Hunnings
(74) *Attorney, Agent, or Firm* — Osha Bergman Watanabe & Burton LLP

(57) ABSTRACT

A method for generating digital emergency alarms is disclosed. The method includes retrieving, by a computing device and from a data packet transmitted by an alarm system controller of a building, an alarm type and an incident location of an emergency incident detected in the building, analyzing, by the computing device based on a building and network layout of at least the building, the alarm type and the incident location to generate an evacuation map specific to a user device connected to the network, where the building and network layout includes a physical location and a network address of the user device, and sending, by the computing device via the network switch based on the network address of the user device, the evacuation map to the user device, where the evacuation map is displayed on the user device to direct a user to evacuate from the emergency incident.

20 Claims, 6 Drawing Sheets

DIGITAL EMERGENCY ALARMS WITH INTELLIGENT EVACUATION PLAN

BACKGROUND

A building alarm system warns people upon detecting a hazardous condition, such as smoke, fire, carbon monoxide, hydrogen sulfide gas, or other fire-related emergencies in or around a building. Evacuation maps are simplified building schematics that guide viewers away from an imminent threat or hazardous area. Typically, these maps show building features such as rooms, doors, exits, hallways, stairwells, and more. Evacuation maps will also show a 'Your Are Here' location and safe exit routes. Additional information such as the location of safety equipment may be included when appropriate.

SUMMARY

In general, in one aspect, the invention relates to a method for generating digital emergency alarms. The method includes retrieving, by a computing device of a network and from a data packet transmitted by an alarm system controller of a building, an alarm type and an incident location of an emergency incident detected in the building, wherein the data packet is transmitted via a network switch of the network, analyzing, by the computing device based on a building and network layout of at least the building, the alarm type and the incident location to generate an evacuation map specific to a user device connected to the network, wherein the building and network layout comprises a physical location and a network address of the user device, and sending, by the computing device via the network switch based on the network address of the user device, the evacuation map to the user device, wherein the evacuation map is displayed on the user device to direct a user to evacuate from the emergency incident.

In general, in one aspect, the invention relates to a computing device for generating digital emergency alarms, The computing device includes a computer processor, and a memory storing instructions, when executed, causing the computer processor to retrieve, from a data packet transmitted by an alarm system controller of a building, an alarm type and an incident location of an emergency incident detected in the building, wherein the data packet is transmitted via a network switch of a network of the building, analyze, based on a building and network layout of at least the building, the alarm type and the incident location to generate an evacuation map specific to a user device connected to the network, wherein the building and network layout comprises a physical location and a network address of the user device, and send, based on the network address of the user device, the evacuation map to the user device, wherein the evacuation map is displayed on the user device to direct a user to evacuate from the emergency incident.

In general, in one aspect, the invention relates to a system for generating digital emergency alarms. The system includes a plurality of user devices used by respective users working in a building, an alarm system controller connected to a plurality of alarm devices disposed throughout the building, and a computing device connected to the alarm system controller and the plurality of user devices, wherein the computing device is configured to retrieve, from a data packet transmitted by an alarm system controller of a building, an alarm type and an incident location of an emergency incident detected in the building, wherein the data packet is transmitted via a network switch of a network of the building, analyze, based on a building and network layout of at least the building, the alarm type and the incident location to generate an evacuation map specific to a user device connected to the network, wherein the building and network layout comprises a physical location and a network address of the user device, and send, based on the network address of the user device, the evacuation map to the user device, wherein the evacuation map is displayed on the user device to direct a user to evacuate from the emergency incident.

Other aspects will be apparent from the following description and the appended claims.

BRIEF DESCRIPTION OF DRAWINGS

Specific embodiments of the disclosure will now be described in detail with reference to the accompanying figures. Like elements in the various figures are denoted by like reference numerals for consistency.

DETAILED DESCRIPTION

In the following detailed description of one or more embodiments, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In general, embodiments disclosed herein provide a method, a network switch device, and a system for generating a digital emergency alarm with an intelligent evacuation plan. More specifically, embodiments disclosed herein connect the emergency alarm system inside a building to the IT network by using existing IT infrastructure. For example, in one or more embodiments, the network output port of the alarm system (e.g. fire alarm) is connected to a network switch port in the same building. On the IT side, pre-identified information determines the best evacuation route based on the incident location and the alarm description and criticality (e.g. there is a fire alarm; this is not a drill) and then broadcast the message and alarm sound to all screens/monitors connected to the network switches in the affected building(s).

In one or more embodiments, an alarm type and an incident location of an emergency incident detected in a building are retrieved by a network switch from a data packet transmitted by an alarm system controller of the building. The alarm type and the incident location are analyzed by a computing device of the network based on a building and network layout of the building to generate an evacuation map specific to a user device connected to the network, where the building and network layout includes a physical location and a network address of the user device. Accordingly, the evacuation map is sent to the user device by the computing device via the network switch based on the network address of the user device, where the evacuation map is displayed on the user device to direct a user to evacuate from the emergency incident.

In one or more embodiments, the network switch further retrieves alarm criticality information from the data packet transmitted by the alarm system controller. During an alarm system test or an emergency drill, an emergency message based on the alarm criticality information is included in the evacuation map to notify the user that the emergency incident corresponds a test or a drill practice.

Figure 1A:
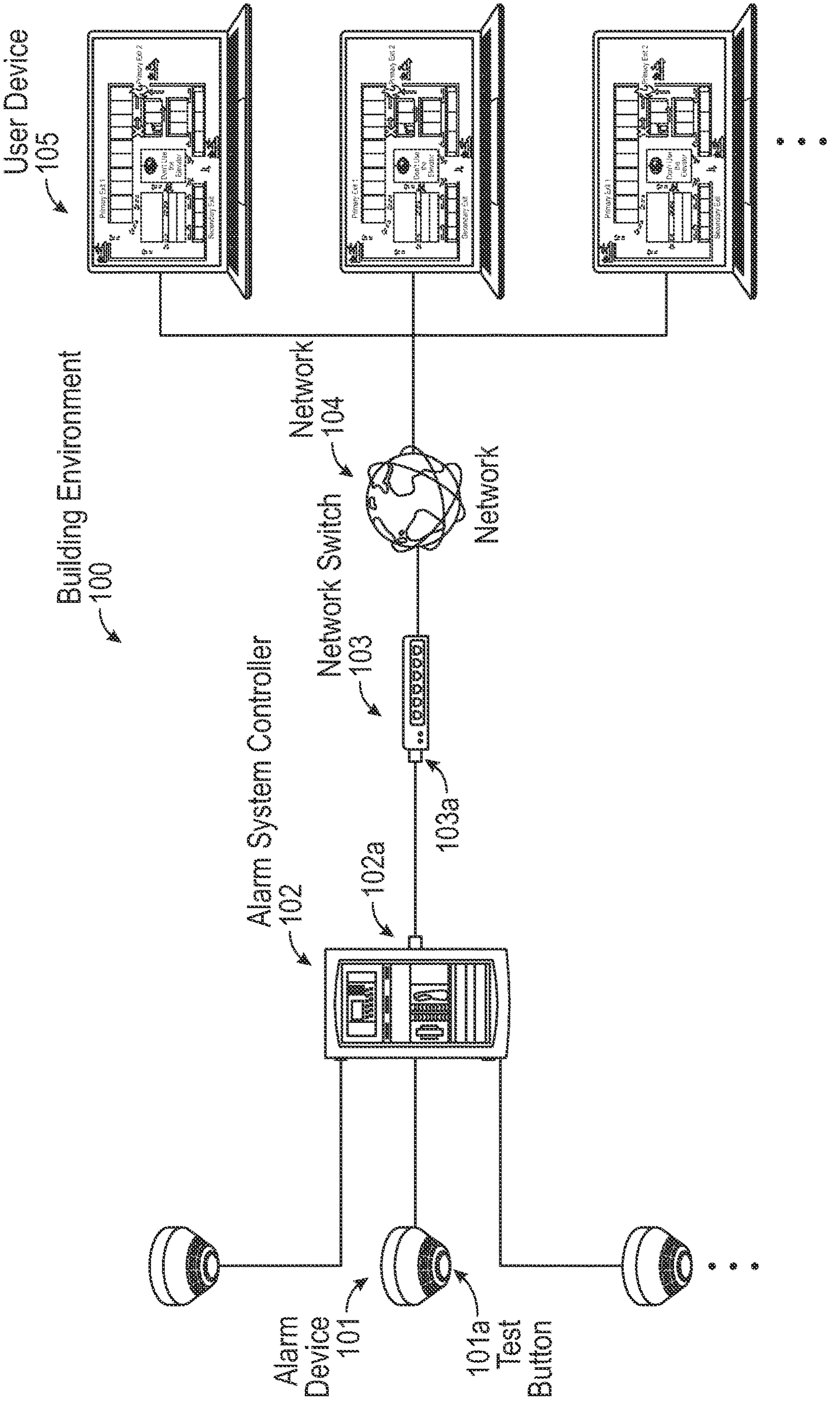
FIGS. 1A-1B show a system in accordance with one or more embodiments disclosed herein.

FIG. 1A shows a schematic drawing of a building environment (100) in accordance with one or more embodiments disclosed herein. In one or more embodiments, one or more of elements shown in FIG. 1A may be omitted, repeated, and/or organized in a different arrangement. Accordingly, the scope of the disclosure should not be considered limited to the specific arrangement of elements shown in FIG. 1A.

As shown in FIG. 1A, the building environment (100) corresponds to physical spaces within and/or around one or more buildings. In one or more embodiments, the one or more buildings include an office building where the physical space is divided into enclosed offices, open cubicles, hallways, rest rooms, equipment closets, and other workspaces and utility facilities. In particular, a number of user devices (e.g., user device (105)) are located throughout the office building that are interconnected via a network (104) and used by respective users working in the office building. Each user device (105) may be a desktop computer, laptop computer, smartphone, or other stationary or mobile electronic devices with computing and display functionalities. The network (104) is a computer network that allows the user devices (105) to communicate with each other and access the Internet using various data communication protocols over digital interconnections. These interconnections are based on telecommunication network technologies employing wired, wireless, radio-frequency, and/or optical media that may be arranged in a variety of network topologies.

In addition to the networked computing devices (e.g., user device (105)), a number of alarm devices (e.g., alarm device (101)) are installed throughout the office building. Each alarm device (e.g., alarm device (101)) is a mechanism that gives an audible, visual or other type of alarm signal to alert users working in the office building regarding an emergency incident. The emergency incident is a problem, threat, or condition that requires urgent attention, such as detection of smoke, fire, carbon monoxide, hydrogen sulfide gas, etc.

An alarm device (e.g., alarm device (101)) may include a test button (e.g., alarm test button (101*a*)) that triggers a test signal when the test button (101*a*) is pushed or otherwise activated by building security or maintenance personnel. The test signal may be an audible, visual, or an electrical alarm test signal. These alarm devices (e.g., alarm device (101)) are connected to an alarm system controller (102), which is a control center and base station for the alarm devices.

The alarm system controller (102) is configured to activate the alarm devices and receive an electrical alarm signal from any alarm device (e.g., alarm device (101)) that detects an emergency incident or generates an electrical alarm test signal. The alarm system controller (102) determines the type of alarm (e.g., fire alarm), the criticality of the alarm (e.g., whether the alarm is a planned test/drill or not), and the physical location of the alarm device that detected the emergency incident (referred to as the incident location) based on the electrical alarm signal and the particular input port receiving the electrical alarm signal. For example, the alarm system controller (102) may determine the criticality of the alarm as an alarm system test when the electrical alarm signal received from the alarm device (101) is an alarm test signal triggered by the test button (101*a*). Further, the physical location of the alarm device (101) and the particular input port connecting the alarm device (101) are correlated and stored together in the alarm system controller (102). For example, when the alarm signal is received via the particular input port connecting the alarm device (101), the alarm system controller (102) retrieves the corresponding physical location as the incident location. The alarm system controller (102) connects to the network (104) via a network switch (103), which is a networking device that uses packet switching for receiving and forwarding data among network nodes.

The alarm system controller (102), network switch (103), network (104), and user devices (e.g., user device (105)) include hardware and software components. The hardware components may include physical parts of a computer, such as a processor, memory and other data storage, display screen with associated graphics card, speaker(s) with associated sound card, etc. By contrast, a software component is the set of instructions that are stored and executed by hardware components. In one or more embodiments, the hardware and software components correspond to the computing system depicted in FIG. 4 below.

In one or more embodiments, the networked computing devices (e.g., user device (105)) are located within the physical space that is monitored by the alarm devices (e.g., alarm device (101)). The hardware and software components of the alarm system controller (102), network switch (103), network (104), and user devices (105) cooperatively deliver digital emergency alarms with an intelligent evacuation plan to the users of the user devices (105). Specifically, emergency alarms, such as smoke, fire, carbon monoxide, hydrogen sulfide gas, or other fire-related alarms, released by the alarm devices (e.g., alarm device (101)) are delivered to the user devices (e.g., user device (105)) located throughout the physical space and presented to the users as visual and audible messages. To deliver the digital emergency alarms with the intelligent evacuation plan, a network output port (102*a*) of the alarm system controller (102) is connected to a network switch input port (103*a*) of the network switch (103). The connection may be a wired or wireless connection, such as a WiFi network connection. One or more IP packets transmitted from the alarm system controller (102) to the network switch (103) via the operatively connected network output port (102*a*) and the network switch input port (103*a*) include alarm data fields that specify the type of alarm (e.g., fire alarm), the criticality of the alarm (e.g., whether the alarm is a planned test/drill or not), the physical location of the alarm device that detected the emergency incident (i.e., incident location), and/or other alarm related information. Based on information retrieved from the IP packets, a computing device of the network executes a mapping software program to determine the best evacuation route according to the alarm type, alarm criticality, and incident location. The computing device may be a computer server (not shown) connected to the network (104), the user device (105), and/or the network switch (103). Emergency messages and alarm sounds are then delivered to all screens/monitors of the user devices connected to the network (104) in the office building where the emergency incident is detected.

In one or more embodiments, the building environment (100) includes multiple physical buildings adjacent to each other within the physical space, referred to as a campus. Within the campus, the network (104) spans across multiple buildings to connect user devices through these multiple buildings. In such embodiments, in addition to the particular building where the emergency incident is detected, one or more neighboring buildings may be determined as affected building(s) where people also need to evacuate. Accordingly, the emergency messages and alarm sounds are delivered to user devices in these affected buildings via the network (104).

Figure 1B:
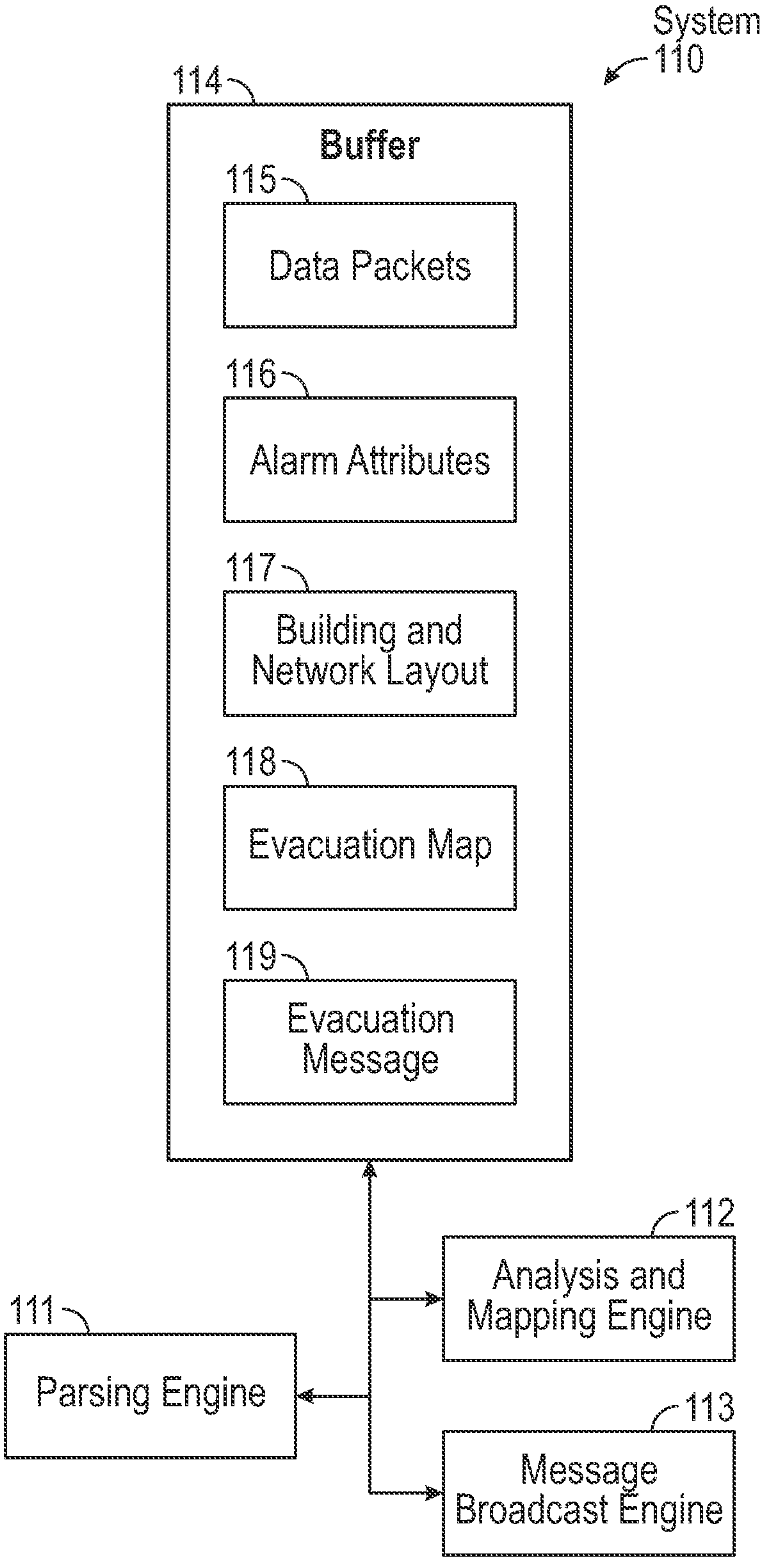

FIG. 1B shows a system (110) in accordance with one or more embodiments disclosed herein. In one or more embodiments, the system (110) illustrates details of the hardware and software components in the building environment (100) depicted in FIG. 1A above. As shown in FIG. 1B, the system (110) has multiple components, including, for example, a buffer (114), a parsing engine (111), an analysis and mapping engine (112), and a message broadcast engine (113). Each of these components (111, 112, 113, 114) may be located on one or more of the alarm system controller (102), network switch (103), network (104), and user devices (e.g., user device (105)) depicted in FIG. 1A above. Each of these components is discussed below.

In one or more embodiments, the buffer (114) may be implemented in hardware (i.e., circuitry), software, or any combination thereof. The buffer (114) is configured to store input data, output results, and intermediate data of the parsing engine (111), analysis and mapping engine (112), and message broadcast engine (113). In one or more embodiments, the buffer (114) stores data packets (115), alarm attributes (116), building layout (117), evacuation map (118), and evacuation message (119). As noted above, the data packets are data transmitted from the alarm system controller (102) to the network switch (103). The alarm attributes (116) are information retrieved from the alarm data fields of the data packets (115). In one or more embodiments, the alarm attributes (116) include the alarm type, the alarm criticality, and the incident location. The building and network layout (117) is a scaled diagram of the arrangement of rooms, cubicles, user devices, emergency exits, and other physical and computer network structures in one or more stories of a building or buildings in a campus. For each user device (105) connected to the network (104), both physical location and network address of the user device is recorded in the building and network layout (117). The evacuation map (118) is an annotated and simplified version of at least a portion of the building and network layout (117) where the annotation describes one or more evacuation routes and other evacuation instructions, such as in the form of visual or audible messages. In particular, the evacuation routes and other evacuation instructions direct users from the user device locations to the emergency exits while avoiding the incident location. The annotation is customized based on the incident location, the user device location, and the alarm attributes. While an evacuation route starts from the physical location of the user device in the evacuation map, the network address of the user device is included as metadata of the evacuation map. The evacuation message (119) is a message that instructs a user how to evacuate from the physical location of the user device following the evacuation map. The evacuation message (119) may include one or more of a text message, a graphical message, and an audible message.

In one or more embodiments, the parsing engine (111) may be implemented in hardware (i.e., circuitry), software, or any combination thereof. The parsing engine (111) parses the data packets (115) to retrieve the alarm type, alarm criticality, and incident location provided by the alarm system controller (102). The retrieved information may be stored in the buffer (104) as the alarm attributes (116).

In one or more embodiments, the analysis and mapping engine (112) may be implemented in hardware (i.e., circuitry), software, or any combination thereof. In particular, the analysis and mapping engine (112) is configured to analyze the alarm attributes (116) and the building and network layout (117) to generate the evacuation map (118) and the evacuation message (119). In one or more embodiments, the evacuation map (118) and the evacuation message (119) are generated for and specific to each user device connected by the network (104) in the particular building where the emergency incident is detected and/or in affected building(s) adjacent to the particular building. In particular, the evacuation map (118) and the evacuation message (119) are customized for and delivered to each user device throughout the building(s) to instruct the user how to evacuate from the user device location.

In one or more embodiments, the message broadcast engine (113) may be implemented in hardware (i.e., circuitry), software, or any combination thereof. In particular, the message broadcast (113) is configured to deliver, based on the network address stored in the metadata of the evacuation map (118), the evacuation map (118) and the evacuation message (119) to each user device connected to the network (104) throughout the building or adjacent affected building(s).

In one or more embodiments, the parsing engine (111), the analysis and mapping engine (112) and the message broadcast engine (110) collectively perform the functionalities described above using the method described in reference to FIG. 2 below.

Although the system (110) is shown as having four components (111, 112, 113, 114), in other embodiments, the system (110) may have more or fewer components. Further, the functionality of each component described above may be split across multiple components. Further still, each component (111, 112, 113, 114) may be utilized multiple times to carry out an iterative operation.

Figure 2:
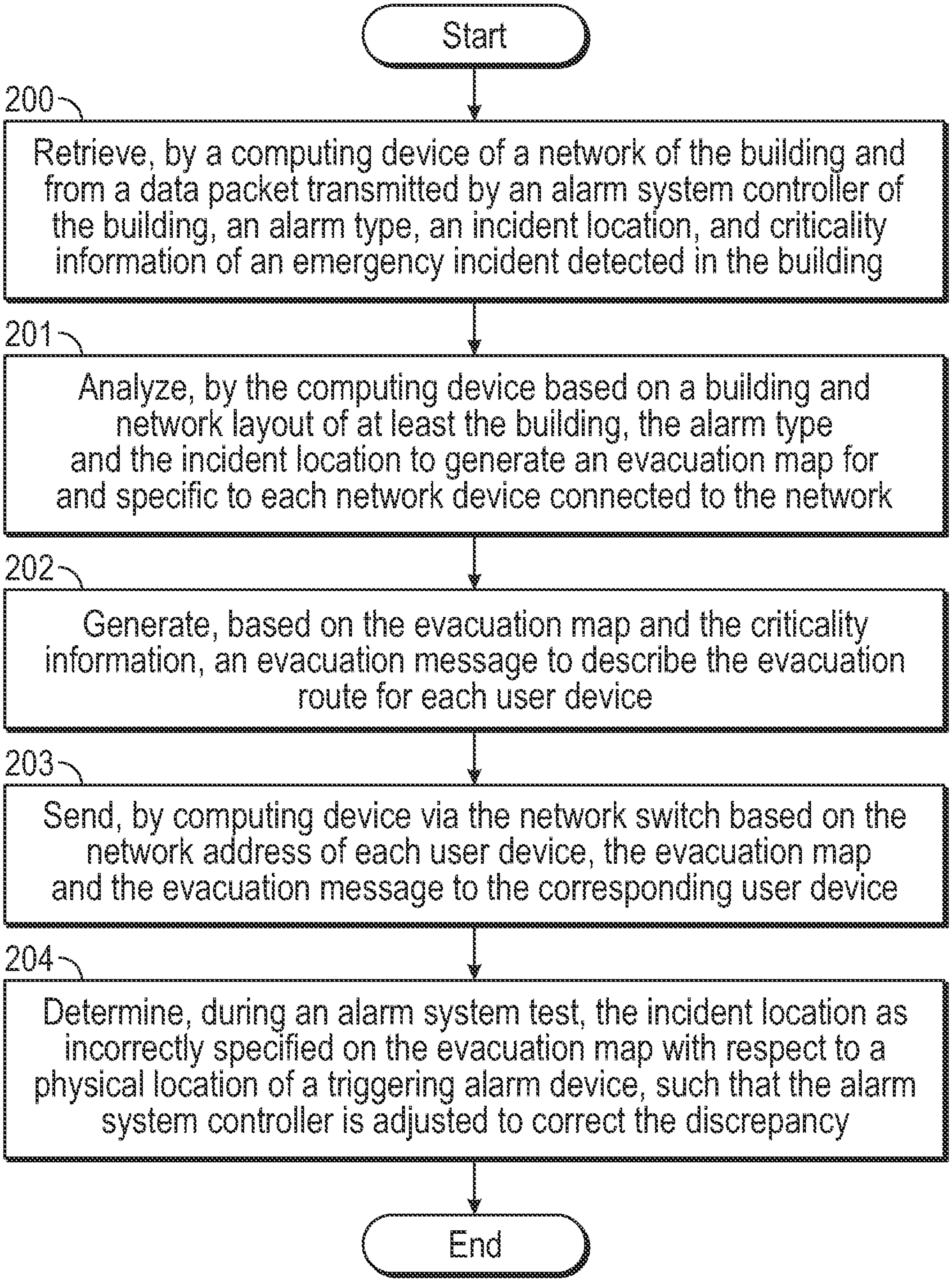
FIG. 2 shows a flowchart in accordance with one or more embodiments disclosed herein.

FIG. 2 shows a flowchart in accordance with one or more embodiments disclosed herein. One or more of the steps in FIG. 2 may be performed by the components of the building environment (100) and the system (110), discussed above in reference to FIGS. 1A-1B. In one or more embodiments, one or more of the steps shown in FIG. 2 may be omitted, repeated, and/or performed in a different order than the order shown in FIG. 2. Accordingly, the scope of the disclosure should not be considered limited to the specific arrangement of steps shown in FIG. 2.

Referring to FIG. 2, initially in Step 200, an alarm type, an incident location, and criticality information of an emergency incident detected in a building are retrieved, by a network switch of a network, from a data packet transmitted by an alarm system controller of the building. In particular, the network connects a number of user devices throughout the building or a campus of multiple buildings that are used by users working in the building/on the campus.

In Step 201, the alarm type and the incident location are analyzed by a computing device of the network based on a building and network layout of the building to generate an evacuation map. The building and network layout includes a physical location and a network address of each of the user devices. The evacuation map is generated for and specific to each user device. To generate each evacuation map, a nearest and safest emergency exit from the physical location of the user device is determined based on the building and network layout. Accordingly, an evacuation route farthest from the incident location and from the physical location of the user device to the nearest emergency exit is generated and included in the evacuation map.

In Step 202, an evacuation message is generated to describe the evacuation route. For example, the evacuation message may describe the type and location of the emergency incident, and how to follow the evacuation route to the nearest emergency exit while avoiding the incident location. In one or more embodiments, the emergency incident is determined, based on the alarm criticality information, as a planned or unannounced emergency drill that is initiated from the alarm system controller by a security or maintenance personnel of the building. Accordingly, the emergency message describes to the user that the evacuation is an emergency drill without real danger from the emergency incident. In one or more embodiments, the emergency incident is determined, based on the alarm criticality information, as an alarm system test triggered by a test button of an alarm device (referred to as the triggering alarm device) that is activated by a security or maintenance personnel of the building. Accordingly, the emergency message describes to the user that the evacuation map is for the alarm system test and no evacuation is necessary.

In Step 203, the evacuation map and the evacuation message are sent to the corresponding user device by the computing device via the network switch based on the network address of the user device. Each of the user devices receives the evacuation map and evacuation message that are customized and specific to the user device. Accordingly, the evacuation map is displayed on the user device to direct a user to evacuate using a route that is away from the emergency incident. In addition, the evacuation message is played back using a speaker of the user device, providing voice guidance describing the evacuation route and the nature of the emergency incident.

In Step 204, during the alarm system test, the incident location is determined to be incorrectly specified on the evacuation map with respect to a physical location of the triggering alarm device. For such determination, the security or maintenance personnel who initiated the alarm system test may review one or more evacuation maps displayed on respective user devices to compare the known physical location of the triggering alarm device with respect to the incident location displayed on each evacuation map under review. Once the comparison reveals any discrepancy, the alarm system controller is adjusted to align the incident location of the alarm system test and the physical location of the triggering alarm device. For example, the physical location and the input port associated with the triggering alarm device stored in the alarm system controller may be updated or otherwise corrected. In another example, one or more alarm devices may be re-wired to the alarm system controller such that the triggering alarm device is plugged into the correct input port associated with the physical location of the triggering alarm device.

Figure 3A:
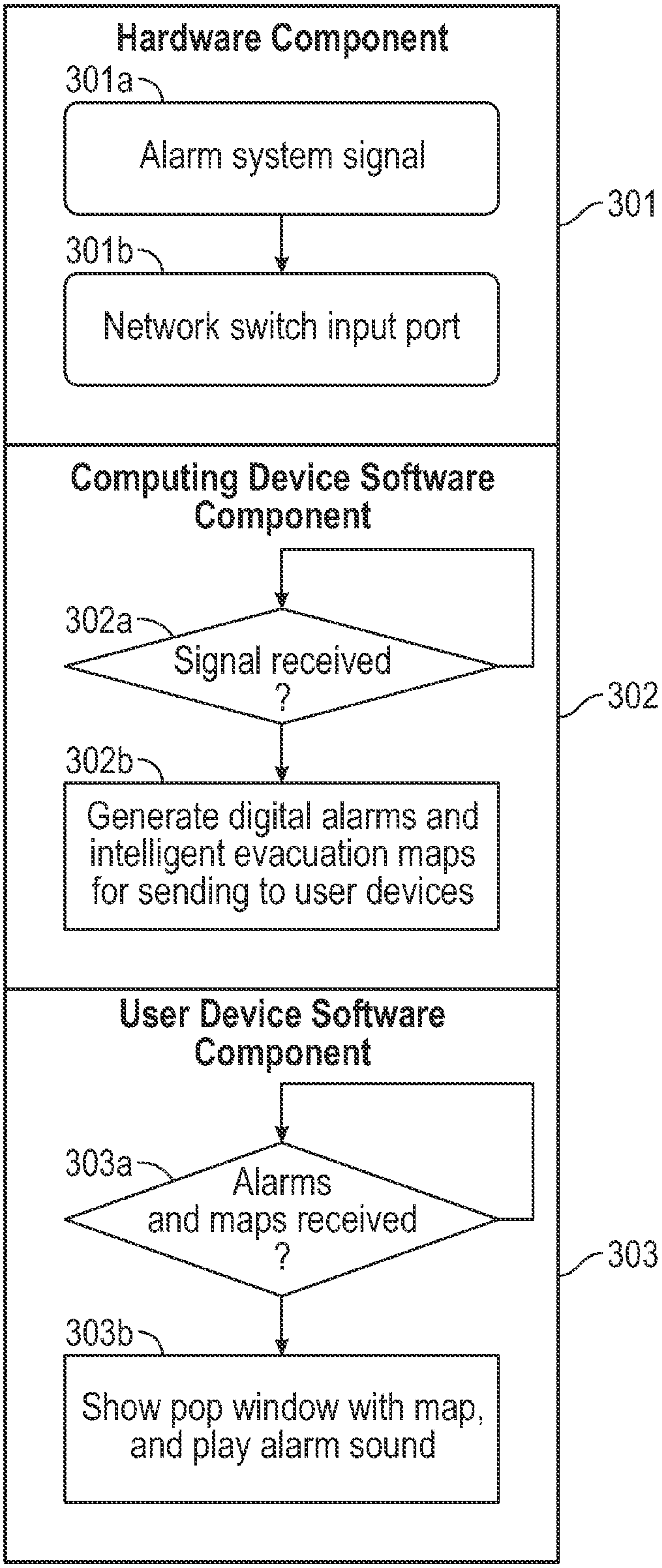
FIGS. 3A-3B show an implementation example in accordance with one or more embodiments disclosed herein.
Figure 3B:
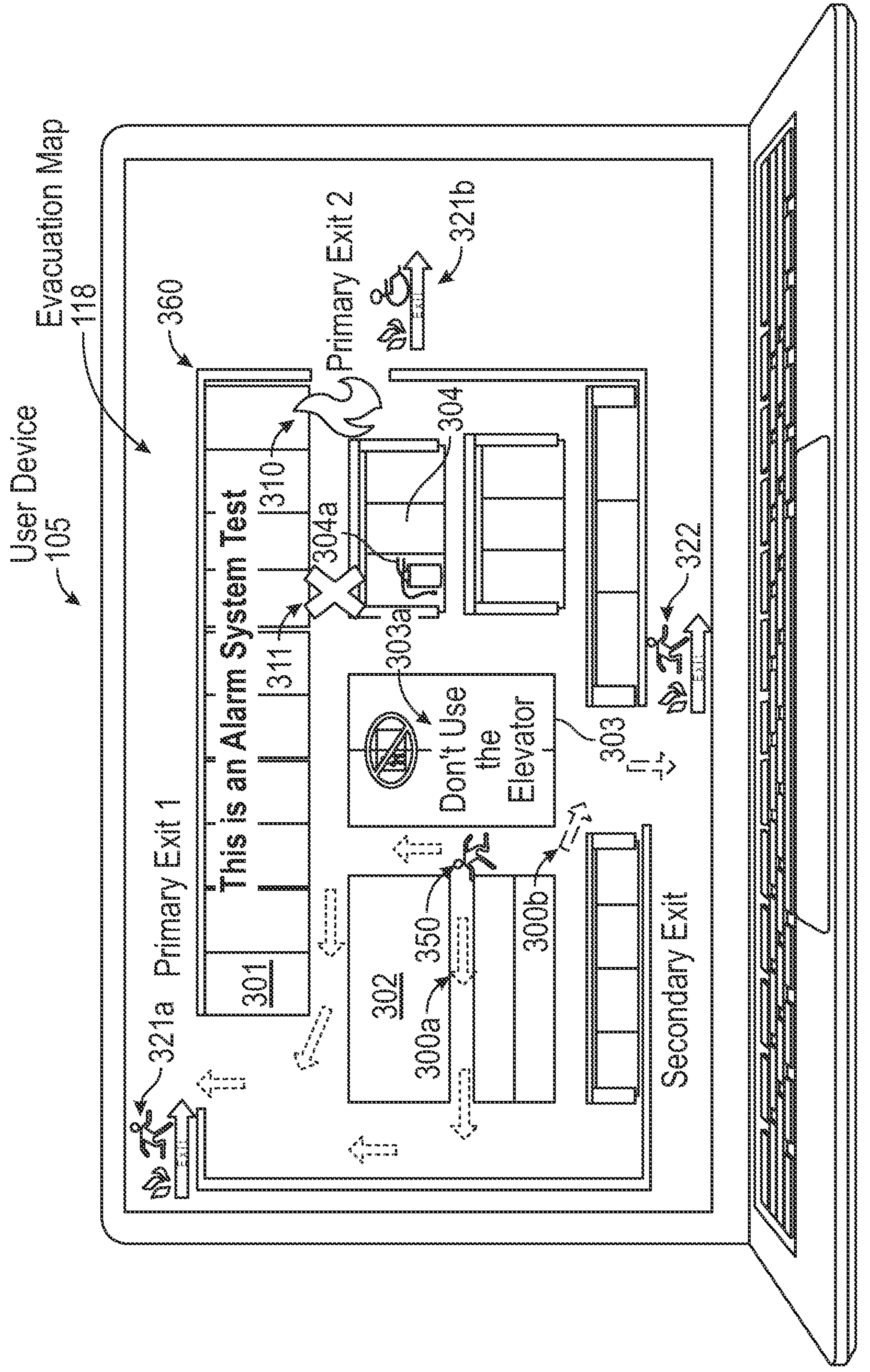

FIGS. 3A-3B show an implementation example in accordance with one or more embodiments. The implementation example shown in FIGS. 3A-3B is based on the system and method flowchart described in reference to FIGS. 1A, 1B, and 2 above. In one or more embodiments, one or more of elements shown in FIGS. 3A-3B may be omitted, repeated, and/or organized in a different arrangement. Accordingly, the scope of the disclosure should not be considered limited to the specific arrangement of elements shown in FIGS. 3A-3B.

FIG. 3A illustrates hardware and software components of the building environment (100) depicted in FIG. 1A above. As shown in FIG. 3A, the hardware component (301) corresponds to the alarm system controller and the network switch where the alarm system signal (301*a*) is received by the network switch via the network switch input port (301*b*). The alarm system signal (301*a*) is in the form of digital data packets. The network switch software component (302) is executed by the network switch to detect any data packets (e.g., a Simple Network Management Protocol (SNMP) trap packet) including emergency alarm information (302*a*) so as to generate digital alarms and intelligent evacuation maps for sending to user devices (302*b*). The user device software component (303) is executed on the user device to detect any evacuation maps or messages (303*a*) from the network switch, which are shown to the user via a pop-up window (303*b*) on the user device, FIG. 3B shows an example of displaying the evacuation map (118) on the user device (105) depicted in FIGS. 1A-1B above. As shown in FIG. 3B, the evacuation map (118) shows the arrangement of offices (e.g., office (301)), open cubicle area (302), elevator (303), fire equipment closet (304), and emergency exits (321*a*, 321*b*, 322). In the evacuation map (118), the arrangement of these structures is annotated with the physical location (350) of the user device (105), the incident location (310), and arrows (e.g., (300*a*), (300*b*)) representing the evacuation routes. In addition, the annotation also includes evacuation messages such as "Don't use the elevator" and an "X" mark indicating the hallway that should be avoided. Because the evacuation map (118) is displayed on the user device (105) corresponding to the location (350), the location (350) corresponds to the 'Your Are Here' location in a typical map. In the example shown in FIG. 3B, the emergency incident is part of an alarm system test, therefore the evacuation map (118) includes the message (360) "THIS IS AN ALARM SYSTEM TEST" to let the user know that there is no need to evacuate. The evacuation map (118) displayed on the user device (105) is reviewed by the security or maintenance personnel who initiated the alarm system test to verify whether the incident location (310) is consistent with the physical location of the triggering alarm device.

Figure 4:
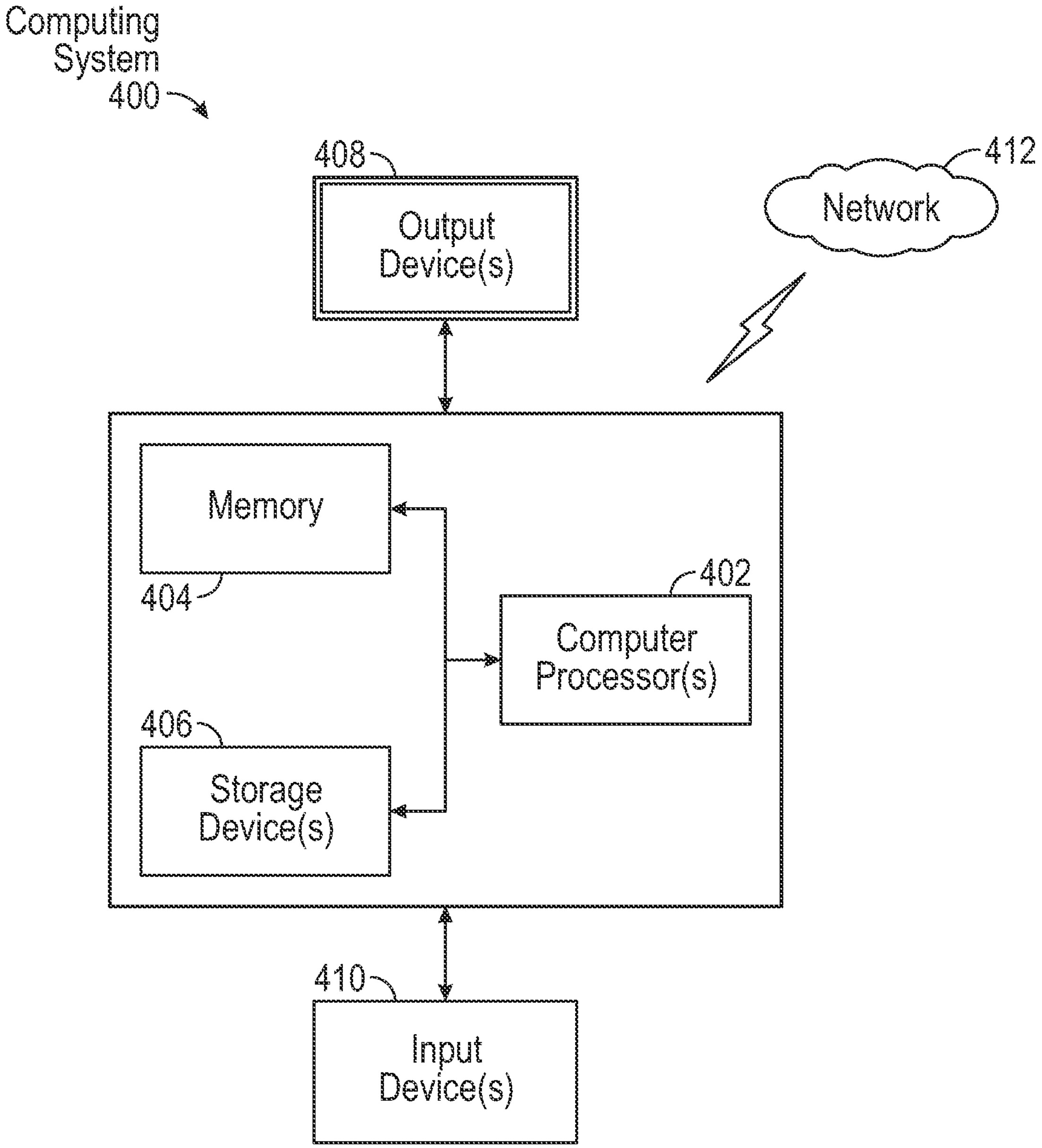
FIG. 4 shows a computing system in accordance with one or more embodiments disclosed herein.

Embodiments disclosed herein may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments disclosed herein.

Further, one or more elements of the aforementioned computing system (400) may be located at a remote location and be connected to the other elements over a network (412). Further, one or more embodiments may be implemented on a distributed system having a plurality of nodes, where each portion of the invention may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating digital emergency alarms, the method comprising:

retrieving, by a computing device of a network and from a data packet transmitted by an alarm system controller of a building, an alarm type, alarm criticality information, and an incident location of an emergency incident detected in the building, wherein the incident location is a physical location of an alarm device detecting the emergency incident, wherein the data packet is transmitted via a network switch of the network;

analyzing, by the computing device based on a building and network layout of at least the building, the alarm type and the incident location to generate an evacuation map specific to a user device connected to the network, wherein the building and network layout comprises a physical location and a network address of the user device, wherein the evacuation map specifies the incident location and an evacuation route;

sending, by the computing device via the network switch based on the network address of the user device, the evacuation map to the user device, wherein the evacuation map is displayed on the user device to direct a user to evacuate from the emergency incident following the evacuation route;

determining, based on the alarm criticality information, the emergency incident as an alarm system test triggered by a test button of the alarm device;

comparing, by viewing the displayed evacuation map, the physical location of the alarm device and the incident location displayed on the evacuation map to identify a discrepancy;

determining, in response to identifying the discrepancy, that the incident location is incorrectly specified in the evacuation map with respect to the physical location of the alarm device, and adjusting the alarm system controller to align the incident location of the alarm system test and the physical location of the alarm device.

2. The method of claim 1, wherein generating the evacuation map comprises:

determining, based on the building and network layout, a nearest emergency exit from the physical location of the user device; and generating an evacuation route, from the physical location of the user device to the nearest emergency exit, that is farthest from the incident location.

3. The method of claim 2, further comprising:

generating an evacuation message to describe the evacuation route; and sending, by the computing device via the network switch based on the network address of the user device, the evacuation message to the user device, wherein the evacuation message is played back using a speaker on the user device to provide voice guidance directing the user to follow the evacuation route to evacuate the building.

4. The method of claim 1, further comprising:

retrieving, by the computing device and from the data packet transmitted by the alarm system controller, alarm criticality information; and including, in the evacuation map, an emergency message based on the alarm criticality information to notify the user that the emergency incident corresponds to one of an alarm system test, a planned emergency drill, and an unannounced emergency drill.

5. The method of claim 4, further comprising:

determining, based on the alarm criticality information, the emergency incident as one of the planned emergency drill and the unannounced emergency drill initiated by the alarm system controller, wherein the emergency message notifies the user that the evacuation is an emergency drill.

6. The method of claim 4, further comprising:

determining, based on the alarm criticality information, the emergency incident as the alarm system test triggered by a test button of an alarm device, wherein the emergency message notifies the user that no evacuation is necessary;

determining that the incident location is incorrectly specified in the evacuation map with respect to a physical location of the alarm device, and adjusting the alarm system controller to align the incident location of the alarm system test and the physical location of the alarm device.

7. The method of claim 1, wherein the user device is located within the building, and wherein the evacuation map directs the user from the physical location of the user device to an emergency exit of the building.

8. The method of claim 1, wherein the building and network layout correspond to a campus of a plurality of buildings comprising the building and an adjacent building, wherein analyzing the alarm type and the incident location by the computing device identifies the adjacent building as affected by the emergency incident detected in the building, wherein the user device is located within the adjacent building, and wherein the evacuation map directs the user from the physical location of the user device to an emergency exit of the adjacent building and away from the building.

9. A computing device for generating digital emergency alarms, comprising:

a computer processor; and a memory storing instructions, when executed, causing the computer processor to:

retrieve, from a data packet transmitted by an alarm system controller of a building, an alarm type, alarm criticality information, and an incident location of an emergency incident detected in the building, wherein the incident location is a physical location of an alarm device detecting the emergency incident, wherein the data packet is transmitted via a network switch of the network;

analyze, based on a building and network layout of at least the building, the alarm type and the incident location to generate an evacuation map specific to a user device connected to the network, wherein the building and network layout comprises a physical location and a network address of the user device, wherein the evacuation map specifies the incident location and an evacuation route;

send, based on the network address of the user device, the evacuation map to the user device, wherein the evacuation map is displayed on the user device to direct a user to evacuate from the emergency incident following the evacuation route;

determine, based on the alarm criticality information, the emergency incident as an alarm system test triggered by a test button of the alarm device;

compare, by viewing the displayed evacuation map, the physical location of the alarm device and the incident location displayed on the evacuation map to identify a discrepancy;

determine, in response to identifying the discrepancy, that the incident location is incorrectly specified in the evacuation map with respect to the physical location of the alarm device, and adjust the alarm system controller to align the incident location of the alarm system test and the physical location of the alarm device.

10. The computing device of claim 9, wherein generating the evacuation map comprises:

determining, based on the building and network layout, a nearest emergency exit from the physical location of the user device; and generating an evacuation route, from the physical location of the user device to the nearest emergency exit, that is farthest from the incident location.

11. The computing device of claim 10, the instructions, when executed, further causing the computer processor to:

generate an evacuation message to describe the evacuation route; and send, based on the network address of the user device, the evacuation message to the user device, wherein the evacuation message is played back using a speaker on the user device to direct the user to evacuate the building.

12. The computing device of claim 9, the instructions, when executed, further causing the computer processor to:

retrieve, from the data packet transmitted by the alarm system controller, alarm criticality information; and include, in the evacuation map, an emergency message based on the alarm criticality information to notify the user that the emergency incident corresponds to one of an alarm system test, a planned emergency drill, and an unannounced emergency drill.

13. The computing device of claim 12, the instructions, when executed, further causing the computer processor to:

determine, based on the alarm criticality information, the emergency incident as one of the planned emergency drill and the unannounced emergency drill initiated by the alarm system controller, wherein the emergency message notifies the user that the evacuation is an emergency drill.

14. The computing device of claim 12, the instructions, when executed, further causing the computer processor to:

determine, based on the alarm criticality information, the emergency incident as the alarm system test triggered by a test button of an alarm device, wherein the emergency message notifies the user that no evacuation is necessary; and determine that the incident location is incorrectly specified in the evacuation map with respect to a physical location of the alarm device, wherein the alarm system controller is adjusted to align the incident location of the alarm system test and the physical location of the alarm device.

15. The computing device of claim 9, wherein the user device is located within the building, and wherein the evacuation map directs the user from the physical location of the user device to an emergency exit of the building.

16. The computing device of claim 9, wherein the building and network layout correspond to a campus of a plurality of buildings comprising the building and an adjacent building, wherein analyzing the alarm type and the incident location identifies the adjacent building as affected by the emergency incident detected in the building, wherein the user device is located within the adjacent building, and wherein the evacuation map directs the user from the physical location of the user device to an emergency exit of the adjacent building and away from the building.

17. A system for generating digital emergency alarms, the system comprising:

a plurality of user devices used by respective users working in a building;

an alarm system controller connected to a plurality of alarm devices disposed throughout the building; and a computing device connected to the alarm system controller and the plurality of user devices, wherein the computing device is configured to:

retrieve, from a data packet transmitted by an alarm system controller of a building, an alarm type, alarm criticality information, and an incident location of an emergency incident detected in the building, wherein the incident location is a physical location of an alarm device detecting the emergency incident, wherein the data packet is transmitted via a network switch of the network;

analyze, based on a building and network layout of at least the building, the alarm type and the incident location to generate an evacuation map specific to a user device connected to the network, wherein the building and network layout comprises a physical location and a network address of the user device, wherein the evacuation map specifies the incident location and an evacuation route;

send, based on the network address of the user device, the evacuation map to the user device, wherein the evacuation map is displayed on the user device to direct a user to evacuate from the emergency incident following the evacuation route;

determine, based on the alarm criticality information, the emergency incident as an alarm system test triggered by a test button of the alarm device;

compare, by viewing the displayed evacuation map, the physical location of the alarm device and the incident location displayed on the evacuation map to identify a discrepancy;

determine, in response to identifying the discrepancy, that the incident location is incorrectly specified in the evacuation map with respect to the physical location of the alarm device, and adjust the alarm system controller to align the incident location of the alarm system test and the physical location of the alarm device.

18. The system of claim 17, wherein generating the evacuation map comprises:

determining, based on the building and network layout, a nearest emergency exit from the physical location of the user device; and generating an evacuation route, from the physical location of the user device to the nearest emergency exit, that is farthest from the incident location.

19. The system of claim 18, wherein the network device is further configured to:

generate an evacuation message to describe the evacuation route; and send, based on the network address of the user device, the evacuation message to the user device, wherein the evacuation message is played back using a speaker on the user device to direct the user to evacuate the building.

20. The system of claim 17, wherein the network device is further configured to:

retrieve, from the data packet transmitted by the alarm system controller, alarm criticality information; and include, in the evacuation map, an emergency message based on the alarm criticality information to notify the user that the emergency incident corresponds to one of an alarm system test, a planned emergency drill, and an unannounced emergency drill.

* * * * *